Patented Aug. 10, 1937

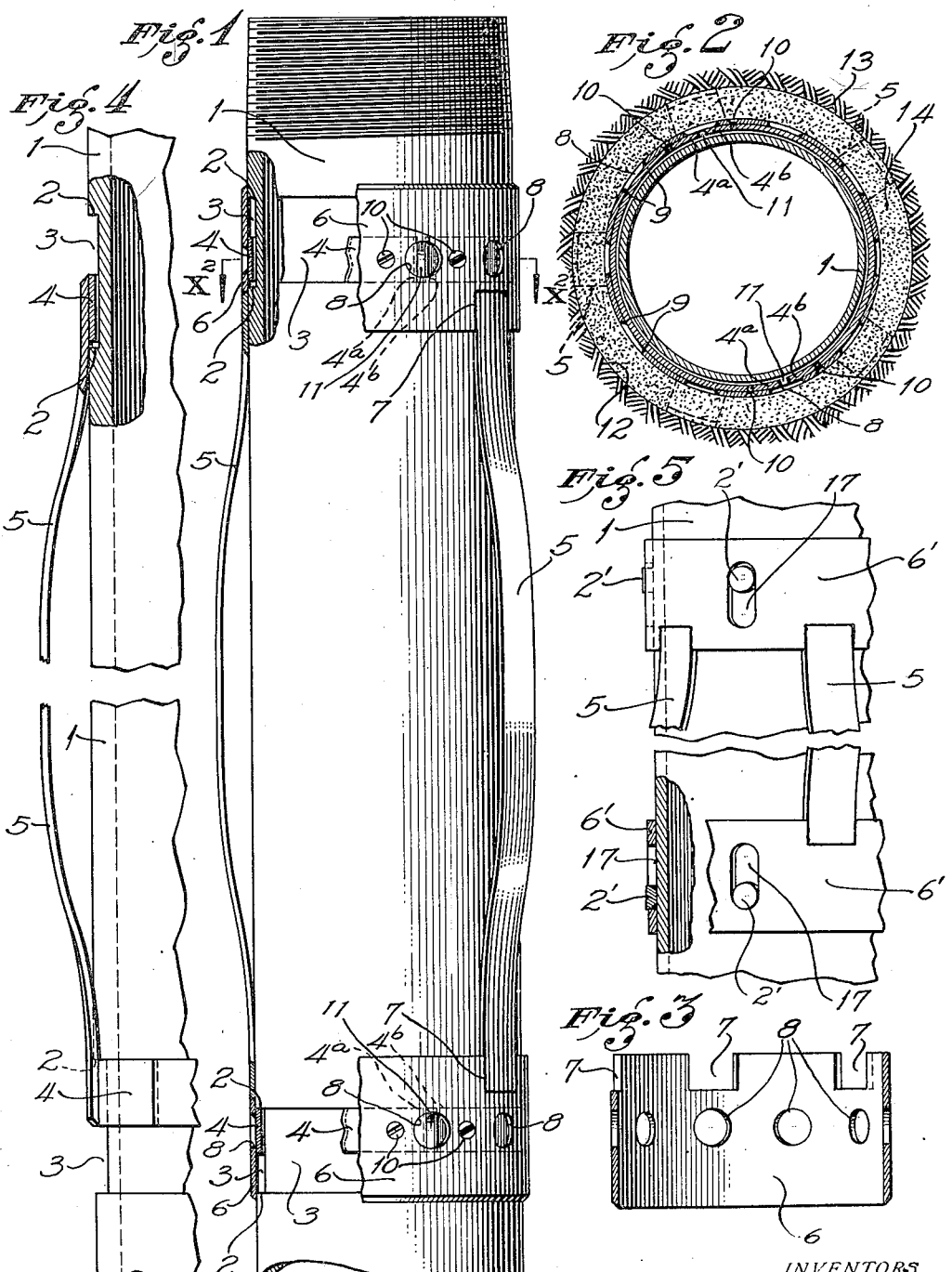

2,089,553

UNITED STATES PATENT OFFICE 2,089,553

CASING CENTERING DEVICE

William Walter Hartman and Robert Alexander Steps, Los Angeles, Calif.

Application October 9, 1935, Serial No. 44,200

4 Claims. (Cl. 166—4)

This invention relates to centering devices used in connection with casing or pipe for centering same either in a larger casing or in a hole or well for any purpose whatever; but in particular this invention is useful for centering such pipe in wells for the purpose of insuring a uniformly thick layer of cement around the outside of the pipe where certain strata are cemented off, as is common in oil, gas, or water wells.

This invention is especially useful where the clearance is very restricted between the pipe to be centered and the hole or other pipe or casing in which it is located, or through which it passes.

The essence of this invention can be embraced in various forms or modifications, some of which we will illustrate in the accompanying drawing, along with our preferred embodiment.

This invention, however, is not limited to the details or forms herein specifically shown or described, nor is it limited in any other manner except by the broad terms of the claims appended hereto.

In the various figures like parts are designated by like numerals.

Fig. 1 is a front view of the preferred form of our invention, certain parts being broken away, and others shown in section, for purposes of clearness. Fig. 2 is a cross section of the device shown in Fig. 1, the section being taken along line $X^2$—$X^2$ of Fig. 1, and earth formation and cement being shown around the device in the manner in which these occur when the device is cemented in place in wells. Fig. 3 is a cross section of the cylindrical end member or collar of the device shown in Fig. 1. Fig. 4 is a partial view, partly in section, of a modified form of this invention. Fig. 5 is a similar partial view, partly in section, of another modification of this invention.

In the figures the pipe to be centered is designated by reference numeral 1, and this pipe is arranged with stops, these stops in Figs. 1 and 4 being the adjacent ends 2 of the two annular grooves 3 formed in the outside surface of the pipe, and in Fig. 5 these stops are the two lugs 2' projecting outwardly from pipe 1.

In Figs. 1 and 4 there are stop rings 4 located in the grooves 3 and these stop rings have connection with the plurality of outwardly bowed springs 5, this connection being direct in Fig. 4, where the springs are directly fastened or welded to the stop rings 4, and being somewhat indirect in Fig. 1, because the springs are first fastened or welded to the cylindrical collars 6, which collars or members are then fastened to the stop rings 4, the details of which fastening will be more particularly described later. In other words, in Fig. 1 the springs 5 have connection with the stop rings 4 through the cylindrical end members or collars 6. To permit ready attachment of springs 5 to cylindrical end members 6, within minimum radial space, we notch the adjacent perimeters of members 6 as indicated at 7, Fig. 3, these notches being formed to nicely receive the ends of springs 5, so that these spring ends can be securely welded to members 6 at the place where they contact notches 7.

In Fig. 1 it will be noticed that the cylindrical collars 6 embrace the outside of the pipe and completely cover the annular grooves 3, in which are located the stop rings 4. Since the stop rings 4 either are an integral part of the cylindrical end members 6 or else are rigidly fastened thereto, it is apparent that special provision for assembly of same on the pipe must be made. If the stop ring 4 and cylindrical member 6 were one integral piece, one mode of installation would be to split the same longitudinally to permit it to be sprung or slipped over the pipe and then the split welded together after the collar and stop ring are in place on the pipe and in the groove; but in preference to this we provide cylindrical member 6 as one piece, with a plurality of large holes 8 therein, and we split the stop rings 4 into two parts, $4^a$ and $4^b$, and then after putting these semi-circular segments of the stop ring into grooves 3 and passing members 6 over them, the stop ring parts $4^a$ and $4^b$ can be permanently fastened to member 6 by welding them together all around the periphery of each hole 8, the nature of such welding being indicated by reference numeral 9 in Fig. 2. To aid in holding the segments $4^a$ and $4^b$ in proper relation with member 6 while welding, accurately placed screws 10, see Figs. 1 and 2, are provided, there being two such screws in each segment, preferably near the severing slots 11. Other means of assembling the stop rings 4 and collar 6, with reference to the pipe and groove 3 can be arranged, but the arrangement just described works satisfactorily in practice.

It is understood, of course, that stop rings 4, in Figs. 1 and 4, are free to rotate and to move slightly lengthwise in grooves 3. Also collars 6, Fig. 1, being fastened to the stop rings 4, are also free to rotate and move lengthwise of the pipe. There is preferably no limit to the rotational freedom of the stop rings and collars on the pipe, but the lengthwise motion is limited by stops 2 of the pipe coming in contact with stop rings 4 in grooves 3.

In the form of the invention shown in Fig. 4, part 4 may be designated both as a cylindrical end member and as a stop ring, because it serves the function of both; and in the form shown in Fig. 1, part 4 may be considered either as a separate element or as a part of cylindrical member 6 to which it is fastened.

In the form of the invention shown in Fig. 5 the cylindrical end members or collars 6' have slots 17 in which the stops 2' of the pipe lie.

In the forms of the invention shown in Figs. 1, 4 and 5 the two spaced stops 2 or 2' are so located with respect to the adjacent cylindrical end members that when the pipe is moved lengthwise in either direction, one or other of the stops 2 or 2' butt against its adjacent cylindrical end member to always pull the entire centralizing device forward with the pipe. In Figs. 1 and 4 the stops 2 obviously butt against the adjacent periphery of the stop rings 4, and in Fig. 5 the stops 2' butt against the adjacent ends of slots 17. The slots 17 in Fig. 5, and the grooves 3 in Figs. 1 and 4 are long enough to permit the springs to fold flat against the pipe when the centralizing device is being pulled forward through any restricted opening, such pulling being always affected by one or the other of stops 2 or 2'. By always pulling the centralizer forward by means of the aforesaid stops, and by never pushing the centralizer from the rear, it follows that springs 5 will always flatten nicely against the pipe in passing through a close restricted hole, and that these springs will never bulge or spear outward into the formation to crush themselves, as they often would do if the device were pushed from the rear into a restricted opening.

The arrangement of parts shown in the drawing lends itself to the production of a strong, practical, efficient centralizer within minimum radial distance from the center of the pipe, thereby making this invention particularly useful in cases where there is very limited clearance between pipe 1 and the hole or larger pipe or casing through which it is to pass, or in which it is to be located for cementing or other purpose.

In Fig. 2 the centralizer is shown in position in hole 12 drilled into the earth formation 13, cement 14 being shown completely surrounding and embedding pipe 1 and centralizer springs 5, etc. The springs 5 hold the pipe nicely centered in the well or hole 12 and consequently when the cement is flowed into place it produces a uniform wall or thickness of the cement 14 all around pipe 1. If no centralizer were used, the pipe would probably lean to one side of hole 12, and the cement would be thin on one side and thick on the other, making it subject to easy fracture on the thin side. In an oil or gas well this would permit water to seep down into the oil or gas formations, resulting in an unsatisfactory or "wet" job. The use of the centralizer prevents this.

In the form of the invention shown in Figs. 1 and 4 the casing 1 can rotate freely in the centralizer. Consequently in lowering the casing into the well the springs 5 will not rotate and scrape or cut the formation, even though casing 1 be rotated in the process. This is an advantage. The form of the invention shown in Fig. 5 does not possess this advantage, because the centralizer with its springs, etc., will rotate with the pipe, this being due to the location of the stops 2' in the slots 17.

We claim:

1. In a centering device of the character described, the combination of a pipe having two stops spaced from each other lengthwise of the pipe, two cylindrical members embracing said pipe, one adjacent to each of said stops and each of said cylindrical members having provision for butting against one of said stops, and outwardly bowed springs having connection with said cylindrical members, each of said stops being so related to the aforesaid butting provision of its adjacent cylindrical member that when the pipe is moved lengthwise in either direction one or the other of said stops will butt against its cylindrical member to always pull the centering device forward with the pipe, and not to push it.

2. In a centering device of the character described, the combination of a pipe having an annular groove in the outer surface thereof, a stop ring in said groove and free to rotate with respect to said pipe, and outwardly bowed springs having connection with said stop ring.

3. In a centering device of the character described, the combination of a pipe with two spaced annular grooves in the outer surface thereof, a stop ring free to move lengthwise and rotate with respect to said pipe located in each of said grooves, and outwardly bowed springs having connection with said stop rings.

4. In a centering device of the character described, the combination of a pipe having two spaced annular grooves in the outer surface thereof, a stop ring free to move lengthwise of and to rotate with respect to said pipe located in each of said grooves, a cylindrical collar embracing the pipe in the vicinity of each of said grooves, each such collar being fastened to one of said stop rings, and outwardly bowed springs fastened to said collars and thereby having connection with said stop rings.

WILLIAM WALTER HARTMAN.
ROBERT ALEXANDER STEPS.